United States Patent [19]

Gohman et al.

[11] Patent Number: 6,143,786
[45] Date of Patent: Nov. 7, 2000

[54] ORAL ARGININE AND INSULIN SECRETION

[75] Inventors: Sharon Marie Gohman, New Brighton; Lester David Michels, Eden Prairie; Norman Alan Greenberg, New Hope; David Curtis Egberg, Shorewood, all of Minn.

[73] Assignee: Novartis Nutrition AG, Berne, Switzerland

[21] Appl. No.: 09/241,459

[22] Filed: Feb. 2, 1999

[51] Int. Cl.$^7$ ............................................. A61K 31/195
[52] U.S. Cl. ......................................................... 514/565
[58] Field of Search ............................................ 514/565

[56] References Cited

U.S. PATENT DOCUMENTS

| | | | |
|---|---|---|---|
| 4,053,589 | 10/1977 | Gans, et al. | |
| 4,234,570 | 11/1980 | Kanbayashi et al. | 424/177 |
| 4,678,670 | 7/1987 | Tomic | 424/127 |
| 5,000,953 | 3/1991 | Ui et al. | 424/115 |
| 5,350,766 | 9/1994 | Suarez | |
| 5,428,070 | 6/1995 | Cooke et al. | 514/557 |

FOREIGN PATENT DOCUMENTS

| | | | |
|---|---|---|---|
| 83 271/82 | 11/1982 | Australia | A23L 1/236 |
| 0 150 053 | 7/1985 | European Pat. Off. | A61K 21/195 |

(List continued on next page.)

OTHER PUBLICATIONS

Efendic, et al., "Role of Glucose in Arginine–induced Insulin Release in Man," Metabolism, vol. 20, No. 6 (1971).

Efendić, et al. "Quantitative Study on the Potentiating Effect of Arginine on Glucose–induced Insulin Response in Healthy, Prediabetic, and Diabetic Subjects," Diabetes, vol. 23, pp. 161–171 (1974).

Henningsson, et al., "Arginine–induced insulin release is decreased and glucogon increased in parallel with islet NO production," Am. J. Physio., vol. 275, No. 3, pp. E500–E506 (1998).

Hollander, et al., "Glucose Modulation of Insulin and Glucagon Secretion in Nondiabetic and Diabetic Man," Diabetes, vol. 31, pp. 489–496 (1982).

Levin, et al, "Enhancement of Arginine–induced Insulin Secretion in Man by Prior Administration of Glucose," Diabetes, vol. 20, pp. 171–176 (1971).

Maccario, et al., "Effects of glucose load and/or arginine on insulin and growth hormone secretion in hyperprolactinemia and obesity," Eur. J. Endocrinol., vol. 135, pp. 205–210 (1996).

Nogowski, e tal., "Arginine Administered in Various Ways, as a Stimulator of Insulin Secretion in the Rabbit,"Horm. Metabol. Res., vol. 18, pp. 730–733 (1986).

Shimizu, et al."Effect of the enteroinsular axis on both the A– and B–cell response to arginine after oral glucose in man," Diabetologia, vol. 30, pp. 846–850 (1987).

van Haeften, et al., "Dose response Characteristics for Arginine–Stimulated Insulin Secretion in Man and Influence of Hyperglycemia," J. of Clin. Endocrinol. and Metab., vol. 69, No. 5, pp. 1059–1064 (1989).

Ward, et al., "Diminished B Cell Secretory Capacity in Patients with Noninsulin–dependent Diabetes Mellitus," vol. 74, pp. 1318–1328 (1984).

Tanner, et al., "Oxidized Low Density Lipoproteins Inhibit Relaxations of Porcine Coronary Arteries," Circulation, vol. 83, pp. 2012–2020 (1991).

Abstract 34, J. Am. Coll. Nutr. vol. 17, No. 5. (Publication date not Available).

American Diabetes Association, Inc. (1994) "Maximizing the Role of Nutrition in Diabetes Management".

Das UN, et al. (1993) "Beneficial effect of L–arginine in non–insulin dependent diabetes mellitus: a potential role for nitric oxide" Med Sci Res, vol. 21, pp. 669–670.

Gannon MC, et al. (1998) "The effects of arginine ingestion, with or without glucose, on the glucose and insulin reponse in normal subjects" Abstract 34, Am College Nutrition, Meeting.

Mitchell JA, et al. (1990) "The generation of L–arginine in endothelial cells is linked to the release of endothelium–derived relaxing factor" European J Pharm, vol. 176, pp. 253–253.

Nogowski L, et al. (1986) "Arginine, Administrated in Various Ways, as a Stimulator of Insulin Secretion in the Rabbit" Horm Metabol Res, vol 18, pp 730–733.

Paolisso G, et al. (1997) "L–Arginine But Not D–Arginine Stimulates Insulin–Mediated Glucose Uptake" Metabolism, vol. 46, No. 9, pp. 1068–1073.

Wascher, TC, et al. (1997) "Effects of low–dose L–arginine on insulin–mediated vasodilatation and insulin sensitivity" Eur J Clin Invest, vol. 27, pp. 690–695.

Arciero, PJ, et al. "Comparison of short–term diet and excercise on insulin action in individuals with abnormal glucose tolerance, " American Physiological Society, pp. 1930–1935 (1999).

Nagulesparan, M, et al. "Diminished Effect of Caloric Restriction on Control of Hyperglycemia Increasing Known Duration of Type II Diabetes Mellitus, " Journal of Clinical Endocrinolgy and Metabolism, vol. 53, No. 3, pp. 560–568 (1981).

XP–002133612, abstract.of DE 29709820 Mar. 1997.

Primary Examiner—Raymond Henley, III
Attorney, Agent, or Firm—Michael P. Morris

[57] ABSTRACT

A therapeutically effective amount of L-arginine, or a physiologically acceptable salt thereof, is orally administered, preferably as a food supplement in combination with a meal approved by the American Diabetes Association Inc. ("ADA"), to a person having Type II diabetes mellitus but who is not on either insulin or other medication for glycemic control. When 3 g to 15 g of L-arginine is ingested concurrently with a meal, or immediately prior to eating a meal, the L-arginine decreases the concentration of insulin generated, compared to that generated after the same meal without the L-arginine; at the same time, concentration of glucose in the person's blood is decreased, indicating that available insulin sensitizes cells so as to nearly mimic the effectiveness of normal cells in a non-diabetic person; from 3 g to 15 g of orally ingested L-arginine, by itself, produces no measurable increase in insulin secretion in a diabetic.

16 Claims, 3 Drawing Sheets

FOREIGN PATENT DOCUMENTS

| | | | |
|---|---|---|---|
| 0 511 587 | 11/1992 | European Pat. Off. | A23L 2/00 |
| 0 625 312 | 11/1994 | European Pat. Off. | A23L 1/28 |
| 29709820 | 6/1996 | Germany . | |
| 297 09 820 | 9/1997 | Germany | A23L 1/30 |
| 60255722 | 12/1985 | Japan . | |
| 61215323 | 9/1986 | Japan . | |
| 2 078 516 | 1/1982 | United Kingdom . | |
| 0 065 462 | 11/1982 | WIPO | A61K 1/236 |
| 9625861 | 8/1996 | WIPO | A23L 1/305 |

ORAL ARGININE AND INSULIN SECRETION

FIELD OF THE INVENTION

In the field of medical nutrition therapy, a person suffering with non-insulin-dependent Type II diabetes mellitus or NIDDM (hereafter, for brevity, defined as "a diabetic") is preferably treated with naturally occurring food ingredients. More specifically the invention relates to the use of L-Arginine, a naturally occurring amino acid and common ingredient of foods, to help a diabetic who is not on medication for glycemic control. By "on medication" is meant either insulin or some other medication to control the level of glucose in his/her blood. Achieving glycemic control helps delay, and may prevent or ameliorate the chronic complications of diabetes.

BACKGROUND OF THE INVENTION

Type II diabetes mellitus is a clinically and genetically heterogeneous group of syndromes characterized by elevated blood glucose levels. It occurs because the insulin produced by the β (beta) cells of the pancreas is either insufficient or ineffectively utilized by target tissues. The body is unable to metabolize macronutrients in foods in the normal manner. When high levels of glucose remain in the blood and spill into urine, microvascular and macrovascular complications arise.

It is well known that optimal blood glucose control delays the onset and progression of diabetes complications, and that medical nutrition therapy is essential to obtain such optimal control. In the past, in the belief that the higher the level of insulin in the blood, the better the metabolization of glucose, great effort has been devoted to pharmaceuticals which stimulate insulin secretion. Among numerous drugs stated to be effective to stimulate secretion of insulin, sulfonamides (sulfonylureas) are preferred. However, to avoid potential side effects and complications associated with medications, it is preferred to treat a diabetic with naturally occurring compounds which are generally regarded as safe to ingest. While diet can be effective to improve glycemic control, post-prandial glucose levels may still be significantly higher for a prolonged period of time in those diabetics following a recommended or approved diabetic diet with adverse effects on glycemic control.

It is well known that L-arginine infused intravenously (IV) functions as a non-glucose insulin secretogogue. Of all the amino acids, L-arginine is known to be the most effective insulin secretogouge, stimulating insulin release as much as 30-fold when administered parenterally. The peak insulin response to an IV arginine dose is typically within two (2) minutes but falls rapidly thereafter, and for this reason is not a useful means of improving glycemic control in diabetics. In diabetics, IV arginine is used exclusively for research and diagnostic purposes. Whichever path is chosen, whether through drugs or naturally occurring food ingredients, to achieve glycemic control, blood glucose levels must be monitored, adjustments to medications must be made, and attention must be paid to the interactions of insulin, food and physical activity.

It has been disclosed that an arginine-enriched medical food having about 180 cals, one-third (33.3%) of which is contributed by 15 g of sugar (58% of the carbohydrate which is an undesirably high quantity of one or more simple sugars in a meal for a diabetic), is marketed as a "fruit bar" referred to as a HeartBar, to enhance the body's production of nitric oxide. Such a sugar-rich fruit bar is contraindicated as a food for a diabetic, and there is no suggestion that enhanced NO production, if it does occur, may have any beneficial effect on a diabetic, irrespective of when the food is eaten. U.S. Pat. No. 5,428,070 to Cooke et al. teaches a method of inhibiting the development of atherosclerosis or restenosis in the vascular system of a human host susceptible to atherosclerosis or restenosis, by administering L-arginine, its physiologically acceptable salts or a biologically equivalent compound thereof, to the host, in accordance with a predetermined regimen, to enhance NO production by NO synthase in an amount sufficient to enhance the level of endogenous NO in the vascular system. For example, it is known that endothilium-derived relaxing factor has been identified as nitric oxide, and is derived from the guanidino group of L-arginine. (see "The generation of L-arginine in endothelial cells is linked to the release of endothelium-derived relaxing factor" by Mitchell, Jane A. et al *European Journal of Pharmacology* 176 (1990), 253–254). The advantages attained by methods using L-arginine are unrelated to the problem of glycemic control in a diabetic. Since the source of such a problem is unrelated to NO production, as is the solution to the problem, there is no motivation to use arginine or a biologically equivalent compound, or a physiologically acceptable salt of arginine to modify glycemic control in a diabetic.

More specifically, oral ingestion of L-arginine in an essentially sugar-free food supplement, consumed in combination with an approved meal (for a compliant diabetic) having less than about 1000 Kcal, preferably less than 500 Kcal, is unconcerned with either the enhancement or the diminution of NO generated as a direct result of the meal. The actual caloric values in "Kcal" are stated herein, rather than reference being made to "calories", as is popular. By "approved meal" is meant a meal approved by a national nutritional organization for the health of a diabetic, for example, the American Diabetes Association Inc. ("ADA") as set forth, for example in "Maximizing the Role of Nutrition in Diabetes Management" published 1994 by the American Diabetes Association, Inc., the disclosures relating thereto being incorporated by reference thereto as if fully set forth herein, or an equivalent approval. Other Western organizations which recommend or approve a meal for a diabetic are The International Diabetes Federation; the European Association For the Study of Diabetes; and the European and Canadian Dietetic Association. Other Eastern and Far Eastern organizations are the Chinese Diabetes Federation; the Japanese Diabetes Federation; and the Indian Diabetes Federation. It will be appreciated that an "approved meal" will vary depending upon the culture and geography of the diabetic, it being understood that, irrespective of either, a compliant diabetic will eat a meal which makes no more than a reasonable demand upon his/her system. By "essentially sugar-free" is meant that a single serving of the food supplement contains less than 10 Kcal of sugar, that is, fructose and/or glucose and/or sucrose. There is no data suggesting that the concentration of NO in the blood is directly related to the degree of glucose intolerance in a diabetic. Further, there is no known relation between the reduction of insulin caused by ingestion of L-arginine in combination with the meal, and the concentration of NO in the blood soon after ingestion of the meal. By "in combination with a meal" is meant that the L-arginine or a physiologically acceptable salt thereof, is ingested either concurrently with, or immediately prior to ingesting the meal, that is, no more than 30 min. prior to ingesting the meal. Physiologically acceptable salts of L-arginine include arginine phosphate, arginine hydrochloride, arginine nicotinate, and arginine related amino acids including di- and tri-peptides of arginine.

Assuming there is an enhancement of NO concentration due to ingestion of L-arginine, there is no motivation to combine L-arginine with low-calorie, essentially sugar free food ingredients to provide a food supplement with the expectation that the resultant increase in NO concentration would benefit a diabetic over a long period of time, from 1 month to 1 year or more, during which period such a meal in combination with the food supplement, was ingested at least once a day.

It is also alleged that L-arginine but not D-arginine, administered parenterally, stimulates insulin-mediated glucose uptake, presumably because nitric oxide, the metabolic mediator for L-arginine, potentiates insulin-mediated glucose uptake through the increase in blood flow. An independent effect of intracellular cyclic guanosine monophosphate (cGMP) on whole body glucose disposal was not ruled out. See *Metabolism* Vol. 46, No. 9, pg 1068–73, September 1997.

Prior to the aforesaid disclosure relating to parenterally administered L-arginine, in an article titled "*Beneficial effect of L-arginine in non-insulin dependent diabetes mellitus: a potential role for nitric oxide*", U. N. Das, I. Krishna Mohan et al., concluded that oral supplementation of L-arginine administered to a Type II diabetic having non-insulin-dependent diabetes mellitus (NIDDM), increased insulin secretion, which in turn may decrease hyperglycemia. None of the test subjects, all but one of whom were long-standing diabetics on either oral hypoglycemic agents or insulin (the title of the article notwithstanding), showed either insulin resistance or insensitivity to oral hypoglycemic agents. There is no indication as to which lone patient, of the 8 patients tested, had his/her condition controlled by diet alone; and there is a clear indication that all patients had their insulin secretion stimulated.

In the study referenced above, after a stabilization period of two weeks to determine base line parameters (pre-arginine), each patient took a 500 mg capsule of pure L-arginine three times a day (a total of 1.5 g each day) for 10 days, in addition to their normal medication, and before measurements were made with blood samples drawn to determine the effects of the treatment. Only one fasting and one post-prandial sample was evaluated for each subject rather than a series of samples over time. This minimal data, makes it premature to conclude that oral arginine stimulates insulin production. In addition, the nutritional components of the lunch, or its characteristics defining the content of carbohydrates, proteins, lipids, etc. was not specified. The level of L-arginine in the blood at any particular time was not stated. Also not stated was the time at which the blood sugar levels were measured (that is, how long after lunch). Comparing post-lunch blood sugar levels of the 8 patients, it is seen that an equal number have their sugar level raised as have their sugar level lowered. It is assumed that the interaction of the medication and L-arginine was responsible for enhancement of insulin secretion, and the variation in sugar levels. We have determined that such enhancement is not found in tests on diabetics who are not on medication administered particularly for enhancement of insulin secretion.

More recently, Nutall J. A. et al have confirmed that ingested protein results in an increase in circulating insulin concentration, and a decrease in glucose concentration in people with type II diabetes, and attributed it at least in part, to the absorbed amino acids given intravenously; IV arginine stimulated the greatest increase in circulating insulin concentration, but also resulted in a small rise in glucose concentration. However, oral arginine was found not to stimulate insulin secretion, in contrast to arginine given intravenously, and there is no report as to the effect of time at which the arginine was given, or what effects of such oral administration on the level of glucose may have been. See *The Effects of Arginine Ingestion, With or Without Glucose, on the Glucose and Insulin Response in Normal Subjects*, a talk delivered at the Meeting of the American College of Nutrition on Oct. 11, 1998.

SUMMARY OF THE INVENTION

It has been found that a therapeutically effective amount of L-arginine, or a physiologically acceptable salt thereof, in the essentially sugar-free food supplement of this invention, when orally administered, concurrently with a meal, or immediately prior to eating a meal, to a person having Type II diabetes mellitus (hereafter "diabetic") but not on either insulin or other medication for glycemic control, decreases the total amount of insulin generated, compared to the amount generated after the same meal without the L-arginine, yet decreases glucose in the person's blood plasma; and, that from 3 g to 15 g of orally ingested L-arginine, by itself, produces no measurable increase in insulin secretion and concentration in a diabetic.

It has also been found that 3–15 g of L-arginine orally ingested in combination with a meal, that is with, or just prior to eating a meal, produces an insulin peak within from about 60–80 min after ingestion of the meal, thereafter diminishing concurrently with a glucose level (also diminishing) which closely approaches or crosses its base level within 4 hours, indicating that despite the diminished supply of insulin relative to that generated without the L-arginine, the utilization of insulin to lower glucose in the blood is surprisingly effective.

A method of treating a Type II diabetic comprises, enterally administering to the diabetic an approved meal in combination with a therapeutically effective amount of L-arginine as a strategic, essentially sugar-free, non-nutritional, supplement to diminish the level of glucose in the blood to a predetermined base level, or below, while maintaining a sufficient level of L-arginine over a period in the range from about 2–4 hr, sufficient for glucose concentration to reach its base level or below it. A dosage amount of L-arginine orally ingested in combination with a meal at a critical time, with or just before a meal, produces and maintains during a period of less than 4 hr, a heightened sensitization of those cells which effectively dispose of glucose, sufficient to lower its level to base level or below within the period without increasing insulin concentration compared to the concentration of insulin generated without the L-arginine. Cells so sensitized thus nearly mimic the effectiveness of normal cells in a non-diabetic person.

It has been found that a relatively small amount of L-arginine, from about 3 g to 15 g for persons having an average range of body mass, orally administered at a critical time, in combination with a meal, not only fails to substantially increase the level of glucose in the blood plasma of a diabetic, but decreases its level without increasing insulin concentration compared to the concentration of insulin generated without the L-arginine; but the L-arginine has an unexpectedly beneficial effect of on the sensitivity of cells which function to clear glucose. The result of such sensitization is evidenced by the lowering of the level of glucose in the blood to base line level, or below, within about 4 hr.

Further, preliminary indications are that the L-arginine causes the level of insulin to peak sooner than it does without the L-arginine, the peak occurring at a time intermediate the times of two sequential peaks typically obtained with a normal (non-diabetic) person given the same amount of L-arginine with the same meal as that given the diabetic.

In the most preferred embodiment, a non-nutritional dosage amount of L-arginine in the range from about 3 g to 15 g, preferably from about 3 g to 10 g, most preferably from about 4 g to 6 g, is blended into an palatable, essentially sugar-free food component as a carrier having a total caloric intake of less than 150 Kcal, preferably less than 100 Kcals in a convenient serving, so that the L-arginine is readily assimilable by the diabetic. A convenient fluid serving has a volume in the range from about 1 to 12 fl oz (fluid ounces), preferably from about 4 to 8 fl oz. When the dosage amount is orally administered in combination with an approved meal, that is concurrently with, or within a critical period just prior to eating an ADA approved meal, that is, from about 5 min but no more than 30 min prior to eating the approved meal, more glucose, in the range from about 15% to 33% more, is cleared (or disposed of) within a unit period (of time) than is cleared without orally administered L-arginine, but essentially without increasing the concentration of insulin compared to the concentration of insulin generated without the L-arginine; evidence of this effectiveness is provided by a comparison of the area under the respective curves plotting concentration of glucose in blood plasma as a function of time.

A meal for a diabetic comprises an approved meal having less than 1000 Kcals in combination with a food supplement comprising an essentially sugar-free serving of a dry mix of L-arginine in an amount in the range from 3 g to 15 g, or a physiologically acceptable salt thereof, blended into a palatable food component or carrier having essentially no sugar and a total caloric intake of less than 150 Kcal, so that the L-arginine is readily assimilable by a person having non-insulin-dependent diabetes mellitus. The essentially sugar-free food supplement is packaged as a "sugar-control" serving of (a) dry mix ingredients to be suspended or dissolved in a drink; or, (b) a sterile drink; or, (c) a hot-packed fluid which sets into a gel post packaging at ambient temperature in the range below about 30° C.

BRIEF DESCRIPTION OF THE DRAWING

The foregoing and additional objects and advantages of the invention will best be understood by reference to the following detailed description, accompanied with graphically illustrated results obtained with preferred embodiments of the invention, and in which.

DETAILED DESCRIPTION OF PREFERRED EMBODIMENTS

Figure 1:
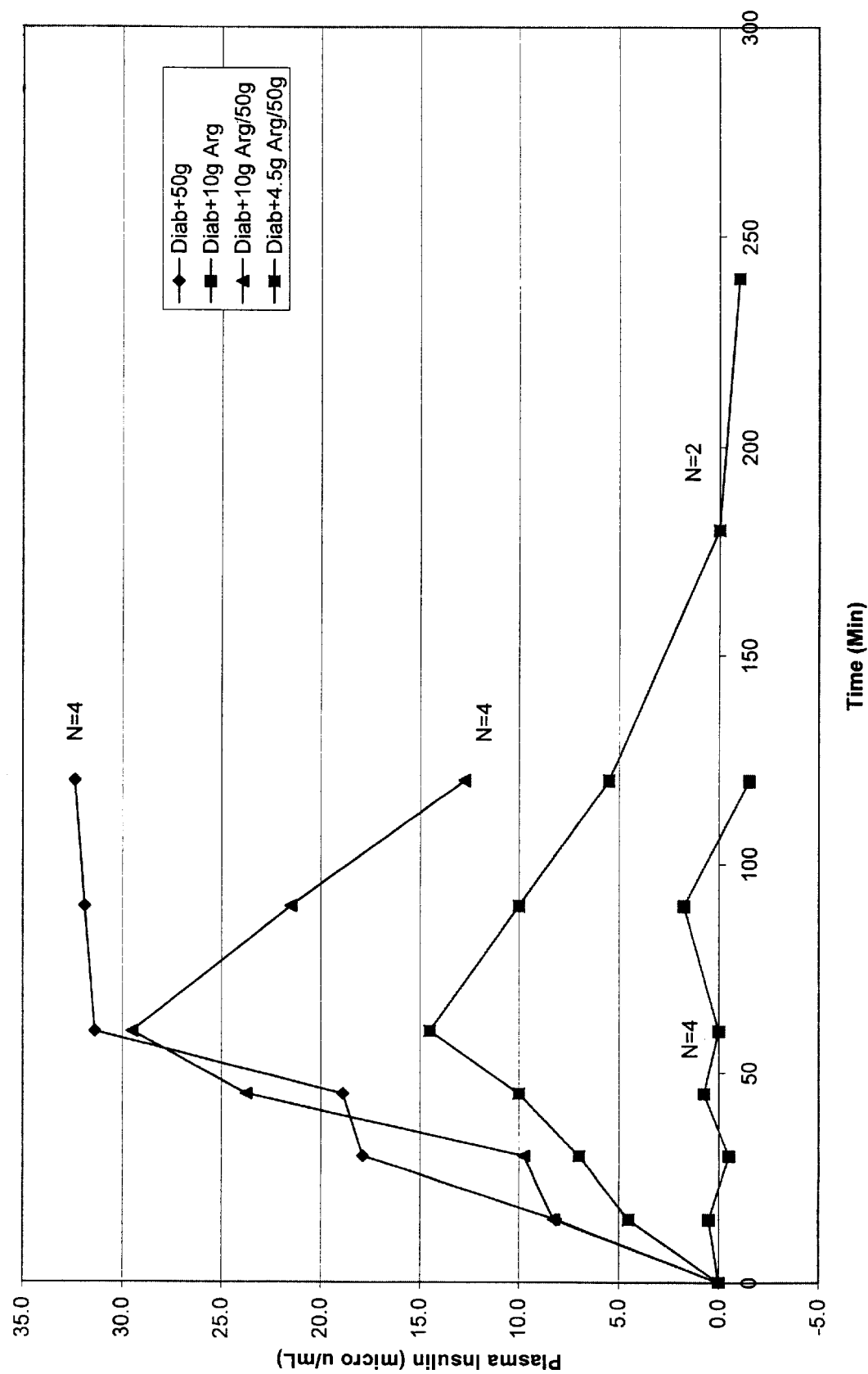
FIG. 1 graphically depicts the concentration of plasma insulin (in µU/mL, microunits per milliliter) as a function of time, after diabetics, on separate occasions, ingested four different "meals".

In the most preferred embodiment the composition of this invention is orally ingested by a diabetic as a supplement to an approved meal, to obtain better glycemic control without requiring administration of exogenous insulin. However, "Just as no one insulin regimen or exercise program works for all people, no one diet prescription can work for everyone with diabetes." (see "*Maximizing the Role of Nutrition in Diabetes Management*", supra, Chapter V. Management of Diabetes Mellitus: Medical Nutrition Therapy and Blood Glucose Monitoring", pg 28). Therefore in the preferred embodiment of this invention, a diabetic will maintain an approved diet which meets the guidelines of the ADA, but will in addition, orally ingest a serving containing L-arginine, with or just prior to eating a meal. It is preferred to ingest the composition just prior to eating an approved meal, so as to introduce the L-arginine into the blood plasma before ingesting the meal. The dosage unit (in a "serving") is also the effective amount of L-arginine to be administered, based on the total body mass of the diabetic.

EXAMPLES

The following examples serve merely to illustrate the invention and should not be deemed a limitation thereof.

Tests were conducted on four (4) healthy males or non-pregnant females, ages 18–45 years, with a body mass index (BMI) between 18–26, and no illness or chronic disease requiring regular medication; and on six (6) diabetic healthy males or non-pregnant females, ages 30–70 years, with diet-controlled NIDDM, and a BMI less than 35, who have no illness or chronic disease requiring regular use of medication.

To normalize the variable effects of meals, even if based on ADA recommendations, the subjects were given 50 g of glucose to provide a standard "meal" for these specific tests. Such a "meal" makes far greater demands on a diabetic than a typical ADA approved meal consisting essentially of from about 55–60% carbohydrate, about 15–30% fat, the remaining about 20% protein, and 20–25 g/day of crude fiber. At intervals of one week, after an overnight fast of 10–12 hr, the subjects were fed liquid servings of 50 g glucose in combination with L-arginine at two different dosage amounts, 4.5 g and 10 g. They were also fed, at weekly intervals, liquid servings of 50 g glucose only; and of 10 g arginine only. All trials were completed within about 12 weeks. The four trials are set forth in Table 1.

Blood, for laboratory analysis, was drawn from each subject 10 min and 5 min prior to the subject having ingested a serving within a 2 min interval. Thereafter blood is drawn after 15 min, and at 15 min intervals for an additional 2 hr. Trial #4 was carried out for 4 hr to track the metabolization of glucose and L-arginine.

TABLE I

| | Oral Supplement | | | Laboratory Measurements | | |
|---|---|---|---|---|---|---|
| | Glucose 50 g | Arginine 10 g | Arginine 4.5 g | Arginine | Glucose | Insulin |
| Trial 1 | X | | | X | X | X |
| Trial 2 | | X | | X | X | X |
| Trial 3 | X | X | | X | X | X |
| Trial 4 | X | | X | X | X | X |

Prior to each trial, all subjects fasted overnight for 10–12 hr prior to each trial. Following the overnight fast, each subject was given the appropriate oral supplement and had his/her blood drawn at 8 different times within a 2 hr to 4 hr period. Results from trials 2, 3 and 4 are compared to those from the control trial, namely, trial 1. Results from trials 2 and 3 were used to determine the dosage amounts of arginine and glucose used in trial 4.

Blood levels of insulin, glucose and L-arginine are evaluated over a period of 2 hr, on 4 separate occasions, after oral ingestion of glucose, arginine, or glucose combined with arginine.

Referring to FIG. 1, the graph identified by reference numeral 1 is for the diabetics who ingested 50 g of glucose only. The concentration of plasma insulin increases, but not smoothly, and does not diminish after 2 hr. The graph identified by reference numeral 2 is for those diabetics who ingested 10 g of L-arginine only. The concentration of plasma insulin remains substantially unchanged at about zero $\mu$U/ML. The graph identified by reference numeral 3 is for those diabetics who ingested 10 g of L-arginine in combination with 50 g of glucose. The concentration of plasma insulin increases, again not smoothly, up to about 60 min, but then diminishes substantially linearly after that time until about 2 hr after consumption. The graph identified by reference numeral 4 is for those diabetics who ingested 4.5 g of L-arginine in combination with 50 g of glucose. The concentration of plasma insulin again increases, more smoothly, up to about 60 min, then diminishes substantially linearly after that time until about 3 hr after consumption, when the concentration of insulin crosses the base line, namely zero, then extends below the base line but close to it, until 4 hr elapse after ingestion. In each case where arginine is combined with the glucose, the concentration of insulin is lower than that which results from glucose alone. The results from two diabetics in trial #4 were not used, as in the case of the first diabetic, all the samples drawn were hemolyzed; and in the case of the second diabetic, insulin levels were so high as to be aberrational. The results from the remaining diabetics in trial #4 are believed to be consistent with the vast majority of persons having NIDDM.

Figure 2:
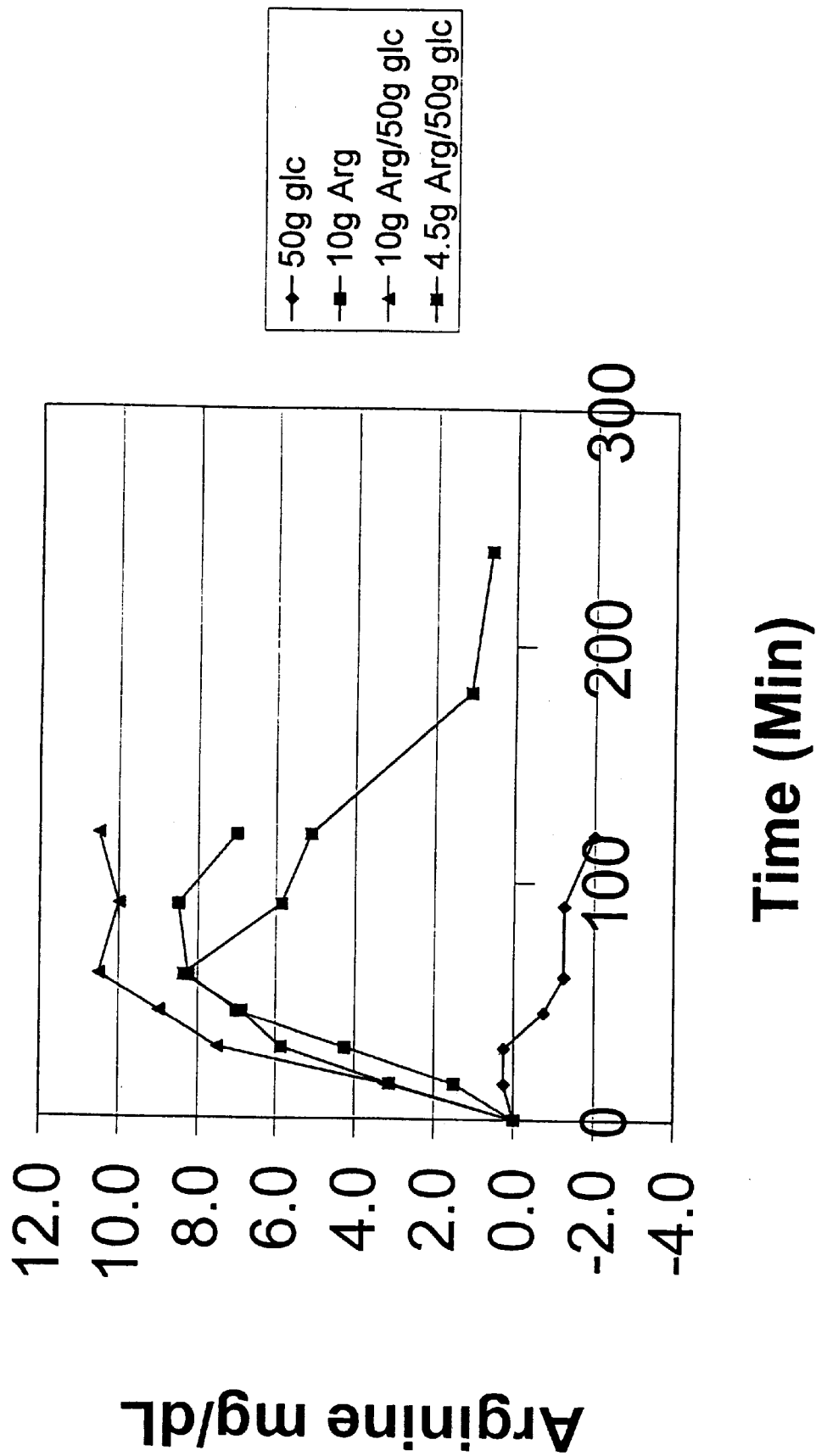
FIG. 2 graphically depicts the concentration of plasma arginine (in mg/dL, milligrams per deciliter, i.e. 100 mL) as a function of time, after the diabetics, on the same separate occasions as in FIG. 1, ingested the four different "meals"; and after normally healthy non-diabetic persons ingested a combination of 10 g L-arginine and 50 g glucose. Normal healthy non-diabetics are not represented.

Referring to FIG. 2, the graph identified by reference numeral 1 is for normal persons who ingested a combination of 10 g L-arginine and 50 g glucose. The concentration of plasma arginine increases, substantially smoothly, and does not diminish after 2 hr. The graph identified by reference numeral 2 is for those diabetics who ingested 10 g L-arginine only. The concentration of plasma arginine increases smoothly until about 60 min but then diminishes, indicating metabolization of some of the L-arginine. The graph identified by reference numeral 3 is for those diabetics who ingested the combination of 10 g L-arginine and 50 g glucose. The concentration of plasma arginine increases, substantially smoothly, up to about 60 min, but then diminishes relatively slowly and continues to diminish substantially linearly until about 2 hr after consumption. The graph identified by reference numeral 4 is for those diabetics who ingested 4.5 g of L-arginine in combination with 50 g of glucose. The concentration of plasma arginine again increases, not as smoothly as with non-diabetics (data not shown to simplify the graph), again up to about 60 min, then diminishes substantially linearly after that time until about 3 hr after consumption, then more slowly until the concentration of arginine approaches and nearly touches the base line, namely zero, after 4 hr.

Figure 3:
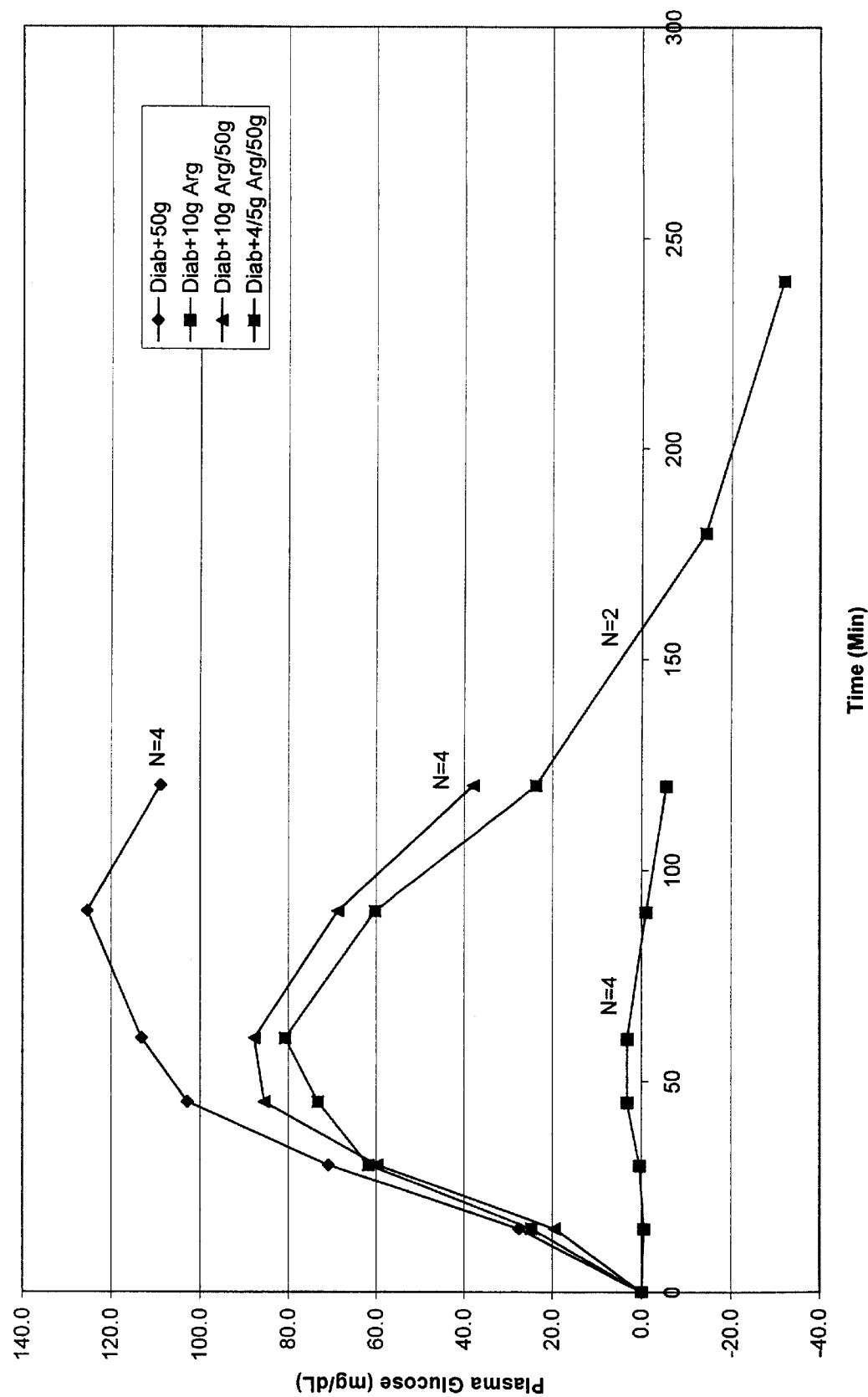
FIG. 3 graphically depicts the concentration of plasma glucose (in mg/dL) as a function of time, after the diabetics, on the same separate occasions as in FIG. 1, ingested the four different "meals".

Referring to FIG. 3, the graph identified by reference numeral 1 is for diabetics who ingested 50 g glucose only. The concentration of plasma glucose increases, appears to peak at 90 min, then diminishes until 2 hr after consumption. The graph identified by reference numeral 2 is for those diabetics who ingested 10 g L-arginine only. The concentration of plasma glucose remains substantially unchanged from the baseline value. The graph identified by reference numeral 3 is for those diabetics who ingested the combination of 10 g L-arginine and 50 g glucose. The concentration of plasma glucose increases, substantially smoothly, up to about 60 min, but then diminishes and continues to diminish until about 2 hr after consumption. The graph identified by reference numeral 4 is for those diabetics who ingested 4.5 g of L-arginine in combination with 50 g of glucose. The concentration of plasma glucose again increases, again up to about 60 min, then diminishes substantially linearly after that time until about 2 hr after consumption, then more slowly until the concentration of glucose crosses the zero base line at about 160 min and decreases still further below the base line to about −40 mg/dL after 4 hr. This reduction in glucose concentration below the base line is a typical occurrence subsequent to a 4 hr glucose tolerance test.

Comparing areas under graphs (curves) 1 and 3, it is seen that the area under curve 3 is about two-thirds (66.6%) of the area under curve 1, indicating that, within a two-hour period, about one-third more glucose is cleared as a result of the ingestion of 10 g of L-arginine.

A non-nutritional dosage unit for oral administration to a diabetic human comprising 3 g to 15 g of L-arginine in combination with a carrier having essentially no sugar and a total caloric intake of less than 250 Kcal, is fed during a critical period, either with the meal, or from about 5 min prior, to no more than 30 min prior to eating food having a caloric value in the range from 250 to 1000 Kcal. Chemically pure L-arginine may be obtained from Sigma Chemical Co; food grade L-arginine may be obtained from Ajinomoto Company.

Thus a method is provided for treating a human diabetic having a predetermined base line level of glucose in his/her blood plasma and not subjected to medication for enhancing insulin secretion, comprising, clearing exogenous glucose in the plasma by enterally administering a non-nutritional dosage unit of L-arginine to the diabetic within a period no greater than 30 min prior to, or concurrently with eating food having a caloric value in the range from 250 to 1000 Kcal, and lowering the insulin concentration in the plasma relative to the amount present when no L-arginine is administered, whereby the glucose level in the blood of the diabetic peaks within a period from about 1 hr to about 1.5 hr of ingesting the food, and thereafter the glucose is cleared at a rate sufficient to reach its base line within about 4 hours.

By "exogenous" glucose is meant glucose generated by consumption of food. A "non-nutritional" dosage unit refers to an appropriate dose of the amino acid in a carrier, together having a caloric value less than 250 Kcal and may include vitamins and/or minerals which have essentially no caloric value.

The L-arginine is preferably in the form of free base, or physiologically acceptable salt preferably acetate, hydrochloride, glutamate or phosphate. The dosage administered will depend upon the total body mass of the diabetic, more specifically the lean body mass, because glucose uptake and utilization is primarily a function of lean tissue. A typical diabetic adult will have a total body mass in the range from about 100 lb to 350 lb. Measurement of lean body mass will vary between adults of identical total body mass, and such measurement, if desired, may be made in any accepted manner known to one skilled in the art.

The carrier preferably comprises a physiologically acceptable food grade organic acid such as citric, malic or lactic, optionally in combination with phosphoric acid, and an artificial or natural sweetener which is not a simple sugar, e.g. a high intensity sweetener such as aspartame, acesulfame-K, sucralose or saccharin, optionally with a natural or artificial color and flavor of choice, typically vanilla, chocolate, coconut, banana, and fruit flavors such as lemon, orange, strawberry, etc. The ingredients of the composition are preferably packaged as a "dry mix" formulation blended so as to be dissolved or suspended in a "sugar-control drink" from about 4 to 8 fluid ounces of water, and drunk. An alternative is a "ready to drink" composition which may be mixed with water in a chosen ratio of ingredients/water, and conventionally sterilized and packaged by aseptic processing and packaging. Still another embodiment is a concentrate using about one-third the amount of water in the "ready to drink" formulation which may be conventionally sterilized and packaged as before, or distributed as a frozen concentrate.

The food supplement may also be packaged for a single serving as a hot-packed "sugar-control gel" having less than about 100 Kcals which is essentially free of sugar consisting essentially of a pharmacologically acceptable L-arginine compound in the range from 3 g to 6 g dissolved in from about 20 g to 80 g fruit juice (about 90% water) adjusted to a pH less than 4.5 and gelled with an edible gum such as konjac. Preferably a serving of "sugar-control gel" is in the range from about 1 to 4 fl oz.

The ingredients of the food supplement, which is required to be essentially sugar-free, do not lend themselves to being packaged as a bar-shaped solid because it is difficult to mask the taste of L-arginine, either in the form of free base or as a pharmacologically acceptable L-arginine compound, without using a substantial amount of sugar. Since a fruit bar of substantially sugar-free ingredients includes toasted or partially cooked grain which may not adequately mask the taste of arginine, enough dried fruits such as figs, tomatoes or apricots, or a mixture thereof, is required to do so. Such an amount in a mixture of grain and fruits referred to as granola, may contribute too much sugar per serving.

Example 1

Two specific illustrative compositions of a dry mix to be dissolved in a drinkable liquid such as water or milk are provided below:

| Ingredient | g/unit dose (serving) |
|---|---|
| A. Flavor: Lemon | |
| L-arginine | 4.5 |
| malic acid | 1. |
| lemon flavoring | 0.1 |
| citric acid | 2.5 |
| acesulfame-k | 0.04 |
| aspartame | 0.05 |
| α-tocopherol | 0.3 |
| ascorbic acid | 0.5 |
| FD&C yellow #5 | 0.0003 |
| Total | 8.99 |
| B. Flavor: Orange | |
| L-arginine (spray dried) | 4.5 |
| orange juice powder | 2.95 |
| citric acid | 1.9 |
| malic acid | 1. |
| fumaric acid | 0.6 |
| α-tocopherol | 0.2 |
| ascorbic acid | 0.2 |
| orange flavor | 0.15 |
| aspartame | 0.06 |

-continued

| Ingredient | g/unit dose (serving) |
|---|---|
| acesulfame-k | 0.05 |
| FD&C yellow #5 | 0.0006 |
| FD&C yellow #6 | 0.0003741 |
| Total | 11.6109741 |

Example 2

A specific illustrative composition of a "sugar-control gel", about 1 fl. oz., and having less than about 50 Kcals less than 20 Kcals of which are contributed by sugar, that is fructose and/or glucose and/or sucrose, is as follows:

| Ingredient | weight, g |
|---|---|
| L-arginine, free base | 4.5 |
| fruit juice | 20. |
| konjac gum | 1. | citric acid and malic acid for pH adjustment to less than 4.5

The fruit juice is heated to about 95° C. (203° F.) to substantially sterilize it, and the pH adjusted to 3.5. The konjac is dissolved in the hot juice and additional color and flavor may be added if desired. The hot liquid is poured into a single serving container and sealed while it is hot.

We claim:

1. A meal for a person having non-insulin-dependent diabetes mellitus comprising a meal approved by the American Diabetes Association Inc. ("ADA") or equivalent, said meal having less than about 1000 Kcal in combination with a food supplement comprising a non-nutritional but therapeutically effective amount of L-arginine in the range from 3 g to 15 g, or a physiologically acceptable salt thereof, blended into a an essentially sugar-free palatable food component or carrier having a total caloric intake of less than 150 Kcal.

2. The meal of claim 1 wherein said approved meal has less than about 500 Kcal, said L-arginine is present in the range from about 4 g to 6 g, and said carrier has a total caloric intake of less than about 100 Kcal and comprises a physiologically acceptable food grade organic acid optionally in combination with phosphoric acid, and a sweetener.

3. A food supplement comprising a non-nutritional but therapeutically effective amount of L-arginine in the range from 3 g to 15 g, or a physiologically acceptable salt thereof, blended into an essentially sugar-free palatable food component or carrier having a total caloric intake of less than 150 Kcal, whereby said L-arginine is readily assimilable by a person having non-insulin-dependent diabetes mellitus.

4. The food supplement of claim 3 wherein said carrier has a total caloric intake of less than 100 Kcal and comprises a physiologically acceptable food grade organic acid optionally in combination with phosphoric acid, and a high intensity sweetener.

5. The food supplement of claim 4 wherein said organic acid is selected from the group consisting of citric, malic and lactic acid; and said high intensity sweetener is selected from the group consisting of aspartame, acesulfame-K, sucralose and saccharin.

6. The food supplement of claim 3 consisting essentially of a gel at ambient temperature.

7. The food supplement of claim 3 consisting essentially of a powder of said ingredients soluble or suspendable in a drink.

8. The food supplement of claim 3 consisting essentially of a drink wherein said ingredients are soluble.

9. A method of treating a Type II diabetic comprising, enterally administering to said diabetic an approved meal in combination with a therapeutically effective amount of L-arginine or a physiologically acceptable salt thereof, as an essentially non-nutritional sugar-free food supplement;

diminishing the concentration of insulin in blood plasma of said diabetic relative to the amount of insulin generated in said diabetic by the same meal without L-arginine;

diminishing the concentration of glucose in the blood plasma of said diabetic to a predetermined base level, or below; and, maintaining a sufficient level of L-arginine in said diabetic over a period in the range from about 2–4 hr, sufficient for glucose to reach its base level or below it.

10. The method of claim 9 comprising administering said food supplement concurrently with an approved meal, or within 30 min of said diabetic consuming said approved meal.

11. The method of claim 10 comprising administering said L-arginine in a carrier comprising a physiologically acceptable food grade organic acid optionally in combination with phosphoric acid, and a high intensity sweetener.

12. The method of claim 11 wherein said organic acid is selected from the group consisting of citric, malic and lactic acid; and said high intensity sweetener is selected from the group consisting of aspartame, acesulfame-K, sucralose and saccharin.

13. A method of treating a person having non-insulin-dependent diabetes mellitus comprising, orally administering to said person a therapeutically effective amount of L-arginine or a physiologically acceptable salt thereof in combination with an approved meal;

maintaining or, diminishing the concentration of insulin in blood plasma of said diabetic relative to the amount of insulin generated in said diabetic by the same meal without L-arginine; yet, clearing more glucose within a unit period (of time) than is cleared without orally administered said L-arginine.

14. The method of claim 13 comprising administering said L-arginine in a carrier comprising an organic acid optionally in combination with phosphoric acid, and a high intensity sweetener.

15. The method of claim 14 wherein said glucose cleared in said unit period is an amount in the range from 15% to 33% more than is cleared without orally administered said L-arginine.

16. The method of claim 14 wherein said organic acid is selected from the group consisting of citric, malic and lactic acid; and said high intensity sweetener is selected from the group consisting of aspartame, acesulfame-K, sucralose and saccharin.

* * * * *